United States Patent [19]

Casselberry

[11] 4,307,517

[45] Dec. 29, 1981

[54] LADY'S GARMENT MEASURING DEVICE

[76] Inventor: Mignon Casselberry, P.O. Box 4, Ojai, Calif. 93023

[21] Appl. No.: 180,377

[22] Filed: Aug. 22, 1980

[51] Int. Cl.³ .............................................. G01C 9/12
[52] U.S. Cl. .......................................... 33/391; 33/7
[58] Field of Search .................... 33/174 D, 370, 371, 33/391, 7, 17, 343, 353, 365, 11, 451

[56] References Cited

U.S. PATENT DOCUMENTS

| | | | |
|---|---|---|---|
| 666,190 | 1/1901 | Fontanella | 33/391 |
| 933,912 | 9/1909 | Matter | 33/391 X |
| 2,137,583 | 11/1938 | Orvold | 33/7 |
| 3,028,679 | 4/1962 | Christy | 33/451 X |

*Primary Examiner*—Harry N. Haroian
*Attorney, Agent, or Firm*—Ralph B. Pastoriza

[57] ABSTRACT

A thin, rigid plane of plastic, wood or heavy card stock approximately 9 inches on a side to define a square is arranged to engage a person's chest. A right angle 90° protractor in turn is secured to the stock with the zero angle line extending along the surface of the device. A weighted pointer hangs free to indicate on the protractor the chest angle to the vertical; that is, the inclination angle of the member to the vertical which in turn determines the chest angle. This chest angle is the same angle to be provided in a control (bust) dart. In other words, this chest angle corresponds to the angle needed to be taken up in the control (bust) dart of the bodice of the pattern for a garment to bring the cross grain line of the fabric to the necessary horizontal position for a proper unwrinkled fit. Other appropriate measurements are made cooperating with the dart angle measurement described to define proper positioning for the dart, so that a proper unwrinkled fit is assured.

1 Claim, 6 Drawing Figures

LADY'S GARMENT MEASURING DEVICE

This invention relates generally to measuring devices and more particularly to a measuring device for a lady's garment to facilitate determination of a proper dart angle and, in cooperation with further measurements, the dart position.

BACKGROUND OF THE INVENTION

In making garments for ladies, the usual practice is to try the particular garment on the person involved and then make appropriate adjustments so as to assure a wrinkle-free fit. For example, the material for the bodice pattern is physically placed over the person's chest and appropriate gathers are made for the control (bust) dart, the amount of material to be put in a dart being directly determined by fitting on the body. In other words, the material is worked while physically on the person to bring the cross grain line of the fabric to the necessary horizontal position for the desired fit. The actual position of the dart angle point has always been determined by direct fitting of fabric on the body. This is later transferred to the pattern if a commercial pattern is being used, or to the master pattern if one is being developed. The bust point itself is determined by two conventional measurements. While these latter measurements can be taken from the person involved and later transferred to the garment pattern, it has always previously been necessary to actually place the fabric for the garment on the person to determine the proper dart angle or degree of gathering to form the dart as above described, and to properly position it in relation to the other elements of the pattern.

BRIEF DESCRIPTION OF THE PRESENT INVENTION

With the foregoing considerations in mind, the present invention contemplates the provision of a new and novel measuring device which will enable a proper determination of the degree of angle needed to be taken up in the control (bust) dart of the bodice of a lady's garment pattern to bring the cross grain line of the fabric to the necessary horizontal position for proper unwrinkled fit without the necessity of actually physically positioning the garment itself on the person.

More particularly, in its broadest aspect, means are provided for engaging a person's chest so as to lie at an inclined angle to the vertical determined by the person's bust size when the person is standing. Further means are provided carried by the first mentioned means defining angles and degrees from a zero angle line positioned at said inclined angle with the vertical. Finally, a vertical oriented indicating means is positioned to visually indicate the angle line assuming a vertical position on the second mentioned means to thereby enable the inclined angle to be accurately read. This angle of inclination of the person's chest or bust corresponds exactly to the degree of angle needed to be taken up in the control (bust) dart of the bodice of the lady's garment pattern to bring the cross grain line of the fabric to the necessary horizontal position for proper unwrinkled fit.

Accordingly, with the device of this invention, it is no longer necessary to have the person present for fitting of the garment provided that the aforementioned angle has been determined along with the other three measurements.

BRIEF DESCRIPTION OF THE DRAWINGS

A better understanding of this invention will be had by now referring to the accompanying drawings in which.

DETAILED DESCRIPTION OF THE PREFERRED EMBODIMENT

Figure 1:
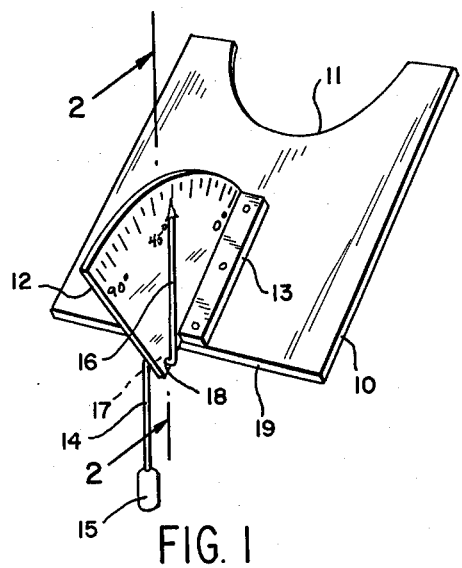
FIG. 1 is a perspective view of the lady's garment measuring device of this invention.

Referring first to FIG. 1, the lady's garment measuring device includes a thin, flat, rigid member 10 which may be made of plastic, wood or heavy card stock. Member 10 is preferably a square shape of approximately nine inches on a side and includes an arcuate cut-out 11 on the top edge which would normally be positioned towards a person's neck when the device is in use.

A 90° protractor 12, in turn, lies in a vertical plane at right angles to the top surface of the member 10 so as to extend in a fore and aft direction as shown. Protractor 12 includes radial lines indicating angle measurements with the zero angle line extending parallel to the top surface of the member 10. In the particular embodiment illustrated in FIG. 1, the protractor 12 is secured to the top surface in this position as by means of a flange 13. Any other appropriate securing means may be used.

Cooperating with the protractor 12 is a pendulum member comprising a rigid wire or rod 14 terminating in a weight 15 at one end and a pointer 16 at its opposite end. Wire 14 has an intermediate portion 17 bent to extend horizontally a given distance, this intermediate portion passing through an appropriate bore 18 at the vertex of the various radial lines on the protractor 12 defining angles.

Figure 2:
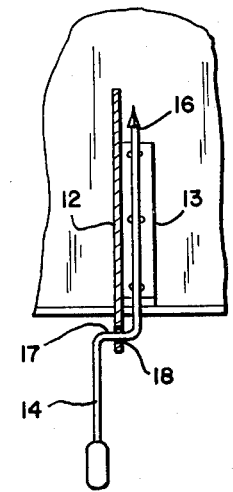
FIG. 2 is a fragmentary front cross section of the device taken in the direction of the arrows 2—2 of FIG. 1.

The foregoing arrangement can best be seen in FIG. 2 wherein the pivotal suspension of the pendulum member is such that the pointer 16 lies in a plane parallel to the surface of the protractor.

From the foregoing, it will now be appreciated that the pointer 16 will always be vertically oriented by the pendulum weight 15, the vertex support point being adjacent to the edge 19 of the member 10 opposite the cut-out 11 so as to permit the pendulum weight 15 to hang freely without interference with the member 10.

Figure 3:
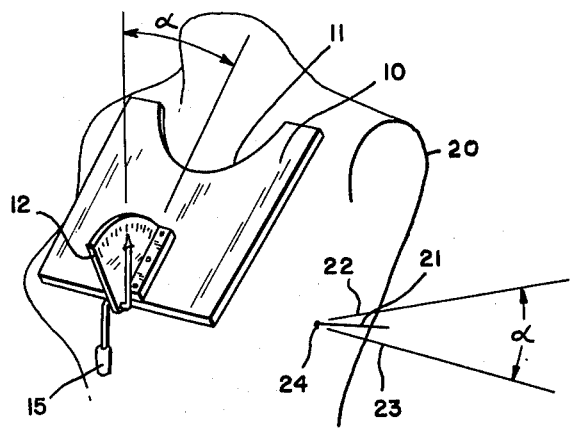
FIG. 3 is another perspective view of the device showing it in position on a person's chest for taking a measurement; and, FIGS. 4, 5 and 6 successively show three additional measurements for use with the measurement effected in FIG. 3 to produce the lady's garment.

FIG. 3 illustrates the flat rigid member 10 resting in an inclined position on the chest or bust of a person 20.

In making an angle measurement in accord with the present invention, the person 20 is standing upright so that the member 10 will assume the inclined angle of the person's chest with respect to the vertical. Since the zero line of the protractor 12 lies along the flat surface of the member 10, and since the indicating pointer of the pendulum will always be oriented vertically, this pointer will visually indicate the inclined angle of the member 10 from the vertical. This angle is indicated as α in FIG. 3 and will correspond to the angle of the control (bust) dart. In other words, the angle α precisely corresponds to the degree of the angle needed to be taken up in the control or bust dart of the bodice of the lady's garment pattern to bring the cross grain line of the fabric to the necessary horizontal position for proper unwrinkled fit. The horizontal grain line is indicated schematically in FIG. 3 at 21 and the limits of the material to be gathered defined by the angle α between lines 22 and 23. The point of the dart is indicated at 24.

That the angle α defining the inclination of the member 10 with the vertical is precisely the same as the angle α for the control dart will be evident by considering the situation where a person, for example, is extremely flat chested such that the angle α approaches zero. Clearly the more "flat-chested" a person is, resulting in less inclination from the vertical of the member 10, then the less is it necessary to gather in material in forming the dart to assure an unwrinkled fit. In the extreme case where α is zero so that the bodice is essentially a "cylinder", there would, of course, be no angle to the dart and thus no necessity of forming a dart.

Figure 4:
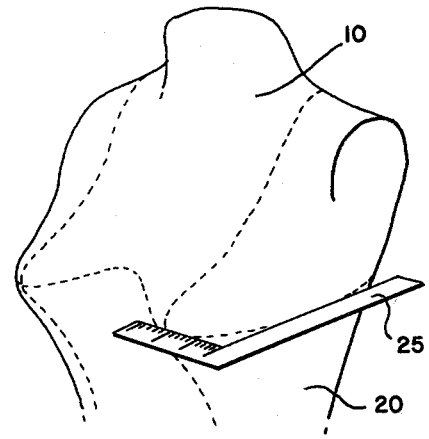
Figure 5:
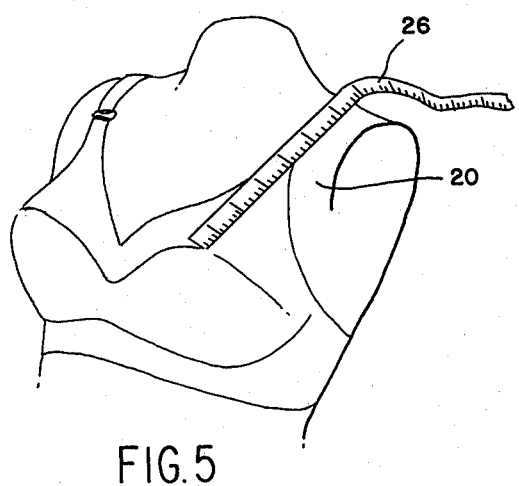
Figure 6:
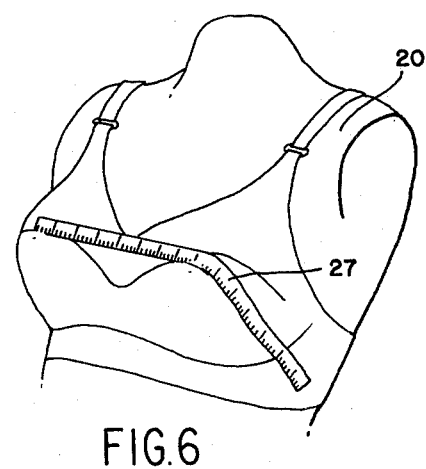

FIGS. 4, 5 and 6 are included to illustrate the other three measurements made in order that the dart described in FIG. 3 can be properly positioned. Thus, the dart point on the pattern will be determined by the distance measured on the person 20 by a supplementary square 25 such measurement being on the side edge between the bust point to the plane of the side of the body; that is, the side at a right angle to the plane of the front of the body after the bust point position has been determined by the other two measurements.

In FIG. 5 the distance of the bust point below the shoulder line on the person 20 is measured, as by the tape 26 and in FIG. 6 the distance between the bust points is measured as by the tape 27.

The foregoing three measurements, together with the angle measurement made by the protractor makes it possible to precisely position on the front bodice of a garment pattern a control dart of the correct size for the individual measured.

It should be understood that by utilizing the protractor as described in FIGS. 1 through 3, it is no longer necessary that a person be recalled after all of the measurements have been made for a physical fitting of the garment in order to determine the dart angle.

It should further be understood that the angle measurement is correct whether the angle of the dart is positioned towards the shoulder, neckline, waistline or other position and whether or not the amount of fabric excess is removed by means other than the darts, such as gathers or fitted seams or whether the amount of angle is divided and portions placed in different positions provided that the total of all portions equals the original amount or angle of incline measured.

From all of the foregoing, it will thus be seen that the present invention has provided a very useful lady's garment measuring device enabling accurate determination of the control (bust) dart angle and its position for such garment.

I claim:

1. A lady's garment measuring device for accurately determining the control (bust) dart angle for such garment, including, in combination:
    (a) a square thin, flat, rigid member for resting in an inclined position on a person's chest, said member having an arcuate cut-out on the top edge towards the person's neck;
    (b) a 90° protractor lying in a vertical plane at right angles to the top surface of said member so as to extend in a fore and aft direction, the radial line for the zero angle on said protractor being parallel to the top surface of said member, the vertex of the radial lines on the protractor being adjacent to the edge of said member opposite the edge having said cut-out, said vertex having a journalling bore therethrough; and
    (c) a pendulum member comprising a rigid wire terminating in a weight at one end and a pointer at its opposite end, said wire having an intermediate portion bent to extend horizontally a given distance to pass through said bore to thereby provide for pivotal supporting of the pendulum member intermediate its ends to said protractor for swinging movement in planes parallel to the protractor such that the pointer is always vertical and will indicate on said protractor the angle of inclination of said rigid member with the vertical, said angle corresponding to the angle needed to be taken up in the control (bust) dart of the bodice of the pattern for said garment to bring the cross grain line of the fabric to the necessary horizontal position for a proper unwrinkled fit.

* * * * *